D. O. NATION.
TIRE SPREADING TOOL.
APPLICATION FILED JULY 6, 1920.
1,373,348.
Patented Mar. 29, 1921.
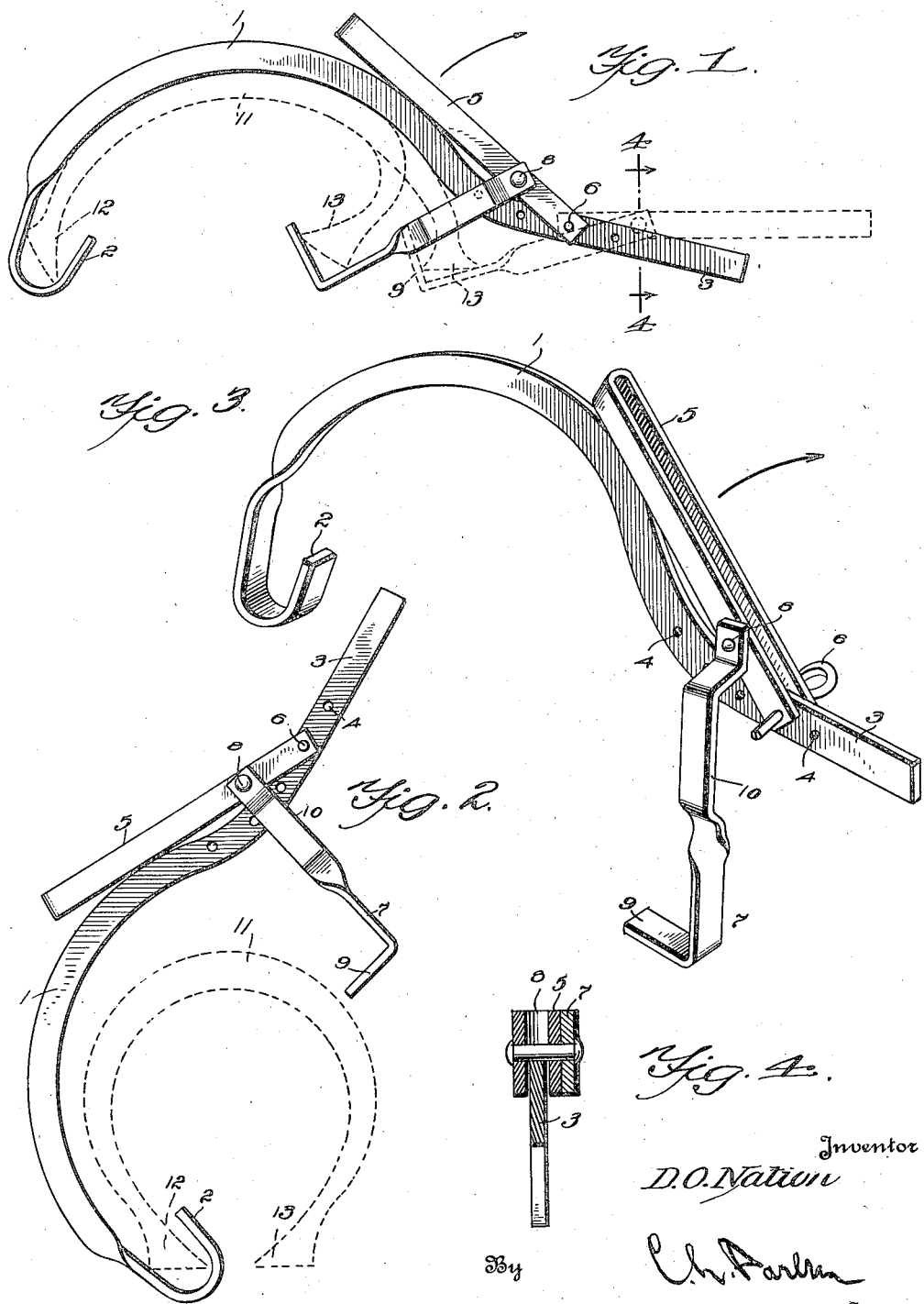

UNITED STATES PATENT OFFICE.

DON O. NATION, OF LOS ANGELES, CALIFORNIA, ASSIGNOR OF ONE-HALF TO WILLIAM E. NATION, OF LOS ANGELES, CALIFORNIA.

TIRE-SPREADING TOOL.

1,373,348.　　　　　　　　Specification of Letters Patent.　　Patented Mar. 29, 1921.

Application filed July 6, 1920. Serial No. 394,145.

*To all whom it may concern:*

Be it known that I, DON O. NATION, a citizen of the United States, residing at Los Angeles, in the county of Los Angeles and State of California, have invented certain new and useful Improvements in Tire-Spreading Tools, of which the following is a specification.

This invention relates to tire spreading tools, and it comprises a curved bar bent concavely to fit around the tire casing and provided with a hook on one end, an arm extending from the opposite end of the curved portion, said arm having spaced slots or openings to permit attachment of an operating arm or handle, the operating arm or handle being provided with an opening near its end adapted to register with one of said slots or openings for the reception of a pin or other fastening element, by means of which the arm or handle is pivoted to the extended arm and another arm having a hook and pivotally secured to the operating arm or handle at a distance from the support thereof.

The present invention is capable of use for spreading tires for various purposes, for repair and inspection. It may be employed to spread tires for vulcanizing, so that sand bags can be placed in the tire or removed with greater ease when retreading, or air bags positioned within the tire are removed when putting in a new section. A plurality of tire spreaders may be attached to a tire casing for removing or placing inner tubes or inner liners.

The present invention provides very simple and effective means for accomplishing the above stated result. The hooked end of the main member is adapted to engage the bead on one side of the tire, thereby spreading one side of the casing. The auxiliary hooked end is then secured beneath the bead on the opposite side and the pivoted handle operated. The two pivots are so arranged that the device becomes locked in open position when both sides of the tire have been spread, because the pivot of the auxiliary hooked end has been thrown past center of the main pivot of the operating handle.

In the accompanying drawings, I have shown one embodiment of this invention. In this showing, Figure 1 is a side elevation of the tool applied to the tire showing one side in extended position.

Fig. 2 is a similar view illustrating the initial operation in the applicaton of the device to a tire.

Fig. 3 is a perspective view of the device removed from the tire, and

Fig. 4 is a vertical sectional view on the line 4—4 of Fig. 1.

Referring to the drawings, the reference numeral 1 designates generally the main portion of the tire spreading tool. As shown, the arm 1 is curved and adapted to be arranged around the tire casing. One end is provided with a hook 2 adapted to engage beneath the bead of the tire. The opposite end of the arm 1 is extended forming a substantially straight extension 3. A plurality of openings 4 are arranged in this extension. An operating handle 5 is secured to the arm 3 and is capable of adjustment for use with tires of different sizes. As shown, the arm is formed of a substantially U-shaped metal provided with alined openings at one end. These openings are adapted to register with the openings 4 in the extended arm and receive a cotter pin 6, or other removable fastening element by means of which the arm 5 is removably secured to the extended arm 3. An auxiliary hook member 7 is pivotally secured to the operating handle as at 8. This auxiliary member is provided with a hook 9 on its free end and a portion thereof is offset as at 10 to permit it to freely pass the pivot of the operating arm. By reference to Fig. 1 of the drawings, it will be noted that the pivot 8 which extends through the two arms of the operating handle 5 forms a stop which will engage the arm 3 when the operating handle is in the dotted line position shown in Fig. 1 of the drawings and prevent further movement thereof.

The operation of the device is as follows:

Referring to Fig. 2 of the drawings, there is shown in dotted lines a tire casing 11 provided with beads 12 and 13. The device is first applied to the tire by arranging the hook 2 under the bead 12, as shown, and then moving the tool from the position shown in Fig. 2 of the drawings to the position shown in full lines in Fig. 1 of the drawings. This operation spreads the tire on the left side as shown in the drawings, the bead 12 being brought to a position shown in Fig. 1. The hook 9 is then brought into engagement with the bead 13, the operating handle being in the full line position illustrated in Fig. 1 of the drawings, and the operating handle is then swung to the dotted line position, the auxiliary hook member 7 moving therewith on its pivot 8 and spreading the opposite side of the tire, the bead 13 assuming a position shown to the right in engagement with the hook 9 in the position shown in dotted lines. It will then be seen that the tire is spread so that various operations may be performed more readily than when the tire is in its normal position, as shown in Fig. 2 of the drawings. When it is necessary to spread the tire throughout its whole circumference, a plurality of tire spreading members may be applied thereto.

By reference to Fig. 1 of the drawings, it will be noted that when the tool is in the dotted line position, the pivot 8, by means of which the arm 7 is connected to the operating handle, has been thrown beyond the center line of the pivot 6 by means of which the operating handle is connected to the main portion of the tool, and that the tendency of any pull exerted by the arm 7 will be to move the operating handle 5 downwardly. By reference to Fig. 4 of the drawings, it will be seen that the pivot 8 is in engagement with the arm 3, thereby preventing downward movement of the handle, and the device is effectually locked. To remove the device from the tire, it is necessary to apply a positive force to raise the operating handle until the pivot 8 passes a center line of the pivot 6, and the normal tendency will then be to return the arm to its normal inoperative position shown in full line.

It is to be understood that, while I have described the preferred embodiment of my invention, various changes in the shape, size, and arrangement of parts may be resorted to without departing from the spirit of the invention or the scope of the subjoined claims.

Having thus described my invention, I claim:

1. A tire spreading tool comprising a body portion having a curved section, a hook arranged at one end thereof, a substantially straight arm integral with and extending from the opposite end of said body portion, an operating handle pivoted to said arm, and an auxiliary hook carried by said operating handle.

2. A tire spreading tool comprising a body portion having a curved section, a hook arranged on one end thereof, a substantially straight arm extending from the opposite end, an operating handle pivoted to said arm, an auxiliary hook member, a tire engaging hook arranged on one end of said member, and a pin securing the opposite end thereof to the operating handle, said pin being adapted to engage said straight arm to limit the movement of the operating handle.

3. A tire spreading tool, comprising a body portion formed on an arc of a circle of substantially greater diameter than that of the tire, a hook arranged on one end of said body portion, a substantially straight arm carried by said body portion and projecting outwardly therefrom, a bifurcated operating handle, the free ends of said handle being arranged on opposite sides of said straight arm and pivoted thereto, an auxiliary hook arm arranged on one side of said bifurcated handle and pivoted thereto, and a limiting pin connected between the opposite sides of said bifurcated operating handle and adapted to contact the upper edge of said straight arm.

4. A tire spreading tool comprising a body portion the edge of which is adapted to contact with the tire, said body portion being bent in the form of a compound reverse curve and having one end twisted at right angles thereto and bent inwardly to form a hook, an operating handle pivotally connected with said body portion near its opposite end, and an auxiliary hook pivoted to said operating handle.

In testimony whereof I affix my signature in presence of two witnesses.

DON O. NATION.

Witnesses:
W. E. NATION,
R. M. NATION.